455-295 SR
FIP8106 XR 2,717,920
SEARCH ROOM
CROSS REFERENCE

Sept. 13, 1955 J. AVINS 2,717,920

NOISE CANCELLATION CIRCUIT

Filed May 16, 1951

INVENTOR
Jack Avins
BY
ATTORNEY

2717920
OR IN 358/157

2,717,920
Patented Sept. 13, 1955

2,717,920

NOISE CANCELLATION CIRCUIT

Jack Avins, Staten Island, N. Y., assignor to Radio Corporation of America, a corporation of Delaware Application May 16, 1951, Serial No. 226,712
1 Claim. (Cl. 178—7.5)

This invention relates to signal processing circuits, and more particularly to signal processing circuits designed to permit the passage only of those supplied signals having amplitudes falling below a predetermined amplitude level, without adversely affecting the waveforms of the signals so passed.

In one of its aspects this invention is concerned with noise immunity in the synchronizing and automatic gain control or AGC circuits of television receivers. A known way of obtaining this noise immunity is to use the AGC circuit to hold the sync peaks of the television signal at a specified level, and to clip the noise which extends beyond this level in the video or sync amplifier. Other known ways include the use of appropriate clipping circuits to clip the noise extending beyond the sync peak heights, wherein the sync peak heights are not kept at a specified level.

Although these know ways normally provide excellent results, there are certain times when the noise is sufficiently strong that the AGC or other reference level "sets up" on the noise.

It is an object of this invention to improve immunity of signal processing circuits to noise impulses.

It is another object of this invention to prevent impulse noise from interfering with the operation of the synchronizing circuits in a television receiver.

According to one form of this invention, improved noise immunity is obtained by providing a noise inverter between the input and the output of a video amplifier. This noise inverter comprises a unidirectional conduction device which is so biased that it will conduit only when noise extending beyond synchronizing pulse level is present at the input of the noise inverter. When the noise inverter conducts it produces an inverted noise pulse which reverses the polarity of or cancels the noise pulse which would otherwise be present at the output of the video amplifier.

Other and incidental objects of the invention will be apparent to those skilled in the art from a reading of the following specification and an inspection of the accompanying drawings in which.

Figure 1:
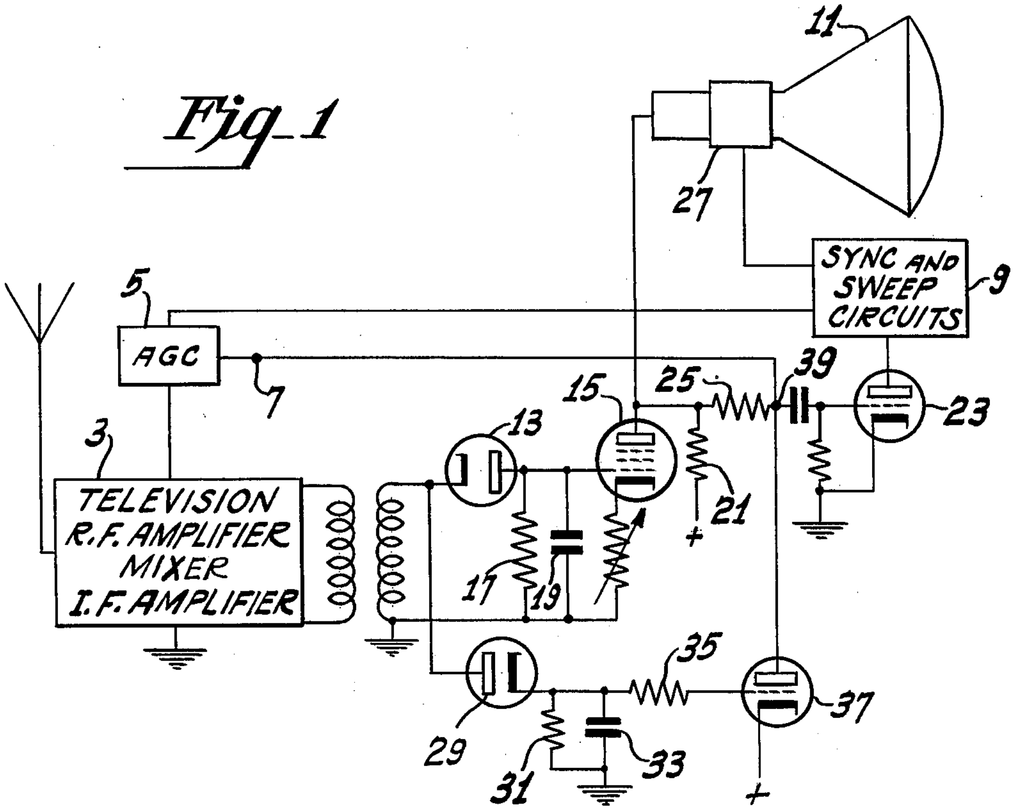
Fig. 1 shows by circuit diagram a television receiver employing an embodiment of the invention.
Figure 2:
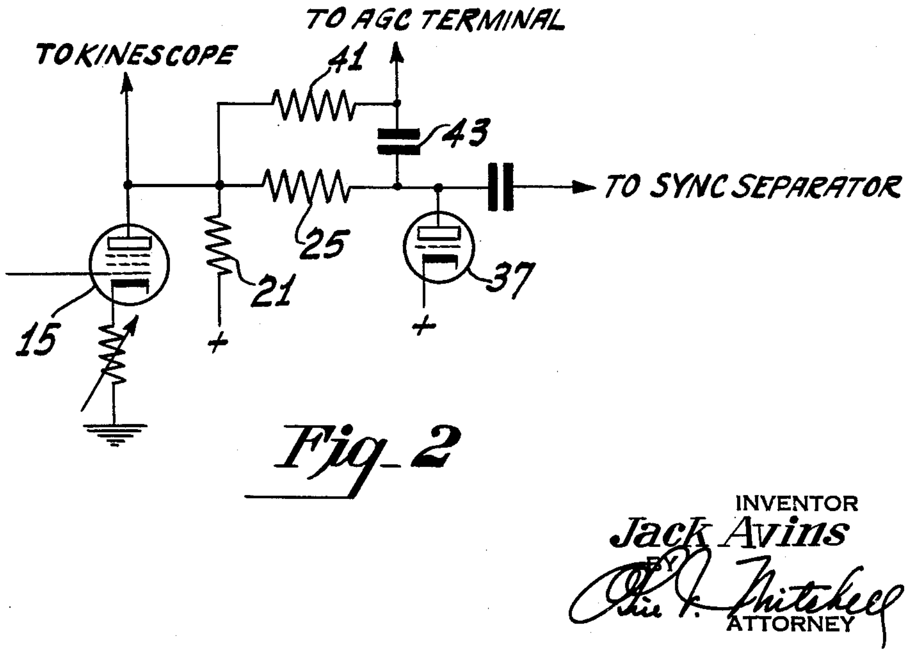
Fig. 2 shows also by circuit diagram a modified circuit employing the embodiment of Fig. 1.

Referring to Fig. 1 there is shown a television receiver, which includes an R. F. amplifier, mixer, and I. F. amplifier section 3, and an AGC circuit 5 having an input terminal 7. Details relating to these circuits, as well as to the synchronizing and sweep circuits 9 and the kinescope 11, have not been shown, as they are well known to those skilled in the art.

The output signal of the video detector tube 13 is fed to the control grid of a video amplifier tube 15. Resistor 17 and capacitor 19 are associated with the video detector tube 13. The anode of amplifier tube 15 is connected to a source of positive potential through resistor 21, and to a synchronizing signal separator tube

23 through a resistor 25. Tube 23 is a clipper designed to clip the synchronizing signal from the composite video signal present at the output of amplifier tube 15. Resistor 25 serves to isolate the anode of amplifier tube 15 from the anode of the noise inverter tube 37. The anode of amplifier tube 15 is also connected to an electrode of kinescope 11. The output of the synchronizing signal separator is connected to the sync and sweep circuits 9, which are connected to the deflection yoke 27 of kinescope 11.

In accordance with the illustrated embodiment of the invention, a detector tube 29 is connected to the input of the video detector tube 13. Resistor 31 and capacitor 33 are associated with the detector tube 29. The output of detector 29 is fed through a resistor 35 to the grid of a noise inverter tube 37. The anode of the tube 37 is connected to point 39, point 39 being the end of resistor 25 remote from the anode of tube 15. Resistor 25 and resistor 21 serve as the plate load of the noise inverter tube 37.

The operation of the circuit is as follows: a positive biasing voltage is applied to the cathode of the noise inverter tube 37 so that it conducts only when noise pulses extending beyond synchronizing pulse height are present at the detectors. When the noise inverter tube 37 conducts, it produces across resistor 25 a negative pulse which is in opposite phase to the positive noise pulse that will have reached this point through the video amplifier tube 15, and substantial cancellation will take place. This action does not require a critical balance between the two pulses: the negative noise pulse developed by the noise inverter tube 37 at its plate will generally exceed the positive noise pulse produced at the same point by the video amplifier. This will momentarily drive the grid of the sync separator tube 23 more negative than is necessary to obtain noise immunity. "White" noise pulses will generally be introduced by the noise inverter tube 37 at its plate, but these "white" pulses will be attenuated sufficiently when they reach the plate of the video amplifier so that "white" noise in the picture will not be observed when the noise inverter tube 37 conduits on noise peaks. The amount of attenuation provided increases as the ratio R25/R21 increases. This factor, together with the desirability of providing a high load resistance for the noise inverter tube 37, shows that resistor 25 should be as large as is consistent with acceptable sync compression at the grid of the sync separator.

Since impulse noise in general is random in amplitude, there will be noise components present at the video detector which (*a*) are smaller in amplitude than the cut-off bias on the noise inverter tube, (*b*) exceed the cut-off bias but do not come up to the level corresponding to zero bias, i. e., full conduction in the noise inverter tube (*c*) and finally those which exceed the zero bias condition for the noise inverter tube.

The noise inverter circuit is not operative for noise components in the (*a*) category. Fortunately, these components have relatively low energy content and therefore their effect on the signal-noise ratio of the sync signal is relatively small. To reduce the number of noise components which fall within this category the bias used on the noise inverter tube should exceed the sync peak height by the smallest margin compatible with the prevention of conduction of this tube on the sync peaks.

To obtain maximum effectiveness for noise components falling in the (*b*) category, a high mu tube should preferably be used for the noise inverter. This will reduce the number of noise components which are unable to cause adequate conduction of the noise inverter tube.

The noise inverter circuit is fully operative for noise components in the (*c*) category.

The plate of the noise inverter tube in Fig. 1 provides a noise immune point 39 which can be used to couple signal level information directly to the grid of a keyed AGC tube.

This arrangement provides additional noise immunity over and above that resulting from the keying action since the signal at point 39 is essentially free of noise in the sync region. The combined effect is to eliminate AGC "setup" (in the AGC tube grid circuit) as a factor in receiver noise immunity. ABC "setup" may still occur, however, in the grid circuits of the controlled tubes if the impedance level therein is too high.

When the grid of the keyed AGC tube is directly coupled to the noise inverter plate, the AGC system shows significantly reduced vulnerability to "setup" on noise. However, the receiver exhibits a strong tendency toward overload when it is switched from a weak to a strong signal. This comes about in the following manner: when the signal increases suddenly the level at the detectors increases before the AGC voltage can change. This causes the noise inverter tube to conduct and to cut off the keyed AGC tube. The receiver remains in this locked-out condition until the input signal is reduced.

To prevent this action, the circuit was modified as shown in Fig. 3. The grid of the keyed AGC tube is returned to the plate of the video amplifier through a resistor 41 rather than to the noise-inverter plate. The enhanced AGC noise immunity is retained by adding a coupling capacitor 43 between the grid of the keyed AGC tube and the plate of the noise inverter tube. This was found to eliminate the tendency toward lock-out when switching from a weak to a strong signal, without impairing the noise immunity of the sync circuits.

Having described my invention, whas it claimed is:

In a superheterodyne television receiving system the combination of: a source of intermediate frequency television signal, said signal comprising a carrier signal amplitude modulated by a composite television signal having a synchronizing pulse component defined by peak carrier excursions of a fixed percentage of carrier modulation, said intermediate frequency television signal fortuitously including noise excursions exceeding the amplitude of said peak carrier excursions; a first signal amplifier means including a first vacuum tube having at least a control electrode, cathode and anode, and including an anode power supply means connected with said cathode, and an output circuit means connected between said anode and said power supply means, said output circuit means including a resistor of relatively low value connected to conduct anode current to said vacuum tube; a first diode demodulator input circuit means of a given demodulation polarity for said first vacuum tube connected with said signal source and between said cathode and said control electrode for supplying demodulated signal to said amplifier representing a carrier modulation envelope of given polarity; a kinescope picture reproducing means; means operatively coupling said kinescope picture reproducing means to said vacuum tube anode; a synchronizing signal responsive deflection circuit means operatively associated with said kinescope picture reproducing means, said deflection circuit means having an input signal terminal; a second signal amplifier means including a second vacuum tube having at least a control electrode, cathode and anode; a first current conducting isolating impedance means including a resistance component of a value substantially greater than said low value resistor included in said first vacuum tube output circuit; means direct current connecting said isolating impedance means between said second vacuum tube anode and said first vacuum tube anode; a second diode demodulator input circuit means for said second vacuum tube of a demodulation polarity opposite to said first diode demodulation means; means connecting said second diode demodulator input circuit means with said signal source and between the control electrode and cathode of said second vacuum tube for supplying demodulated signal thereto representing a carrier demodulation envelope opposite in polarity to that supplied to said first vacuum tube; means included in said second signal amplifying means rendering it ineffective for signals falling below said synchronizing pulse component; means included in said first and second amplifying means for relating the signal gains thereof to produce signal cancellation across said isolating impedance; and means coupling the point of connection of said second vacuum tube anode with said isolating impedance to the input signal terminal of said deflection circuit means; the relative values of said resistor included in said first amplifier output circuit and said isolating impedance means resistance component being such as to isolate said first vacuum tube anode from signals delivered by said second signal amplifying means to an extent which prevents signals passed by said second amplifying means from producing undesirable disturbance in the picture produced by said kinescope picture reproducing means.

References Cited in the file of this patent

UNITED STATES PATENTS

| | | |
|---|---|---|
| 2,166,995 | Koch | July 25, 1939 |
| 2,247,324 | Travis | June 24, 1941 |
| 2,265,883 | Applegarth | Dec. 9, 1941 |
| 2,286,450 | White et al. | June 16, 1942 |

FOREIGN PATENTS

| | | |
|---|---|---|
| 631,377 | Great Britain | Nov. 2, 1949 |

OTHER REFERENCES

Rider's Television Manual, vol. 5, RCA TV, pages 5–77 (RCA chassis KCS 38, 1950).